(12) United States Patent
Hampapuram et al.

(10) Patent No.: US 8,127,275 B1
(45) Date of Patent: Feb. 28, 2012

(54) SYSTEM AND METHOD FOR RECORDING THE STATE OF VARIABLES AND OBJECTS WHEN RUNNING UNIT TESTS

(75) Inventors: Haripriyan Hampapuram, San Diego, CA (US); Roberto Scaramuzzi, San Diego, CA (US)

(73) Assignee: Parasoft Corporation, Monrovia, CA (US)

( * ) Notice: Subject to any disclaimer, the term of this patent is extended or adjusted under 35 U.S.C. 154(b) by 1039 days.

(21) Appl. No.: 12/036,953

(22) Filed: Feb. 25, 2008

Related U.S. Application Data

(60) Provisional application No. 60/912,586, filed on Apr. 18, 2007.

(51) Int. Cl.
*G06F 9/44* (2006.01)
(52) U.S. Cl. ........ 717/124; 717/126; 717/127; 717/131; 717/135; 714/38.1
(58) Field of Classification Search .................. None
See application file for complete search history.

(56) References Cited

U.S. PATENT DOCUMENTS 5,261,073 A * 11/1993 Mann ................................. 711/5
(Continued)

OTHER PUBLICATIONS

Title: A Test Data Generation Tool for Unit Testing of C Programs, author: Zhongxing Xu et al, source: IEEE, dated: Oct. 27, 2006.*

(Continued)

*Primary Examiner* — Chameli Das
(74) *Attorney, Agent, or Firm* — Chrisite, Parker & Hale, LLP.

(57) ABSTRACT

A system and method for recording a state of an object in a computer program being tested. The system and method include: identifying an object having a plurality of fields, each field having a value; executing the computer program including a unit test; recording the values of each field of the identified object; generating assertions for the unit test from the recorded values of each field of the identified object; and inserting the generated assertions into the unit test. The computer program including the unit test having the generated assertions may be re-executed to verify the assertions. Furthermore, the unit test having the generated assertions may be modified and the computer program including the modified unit test having the generated assertions re-executed to generate new assertions.

14 Claims, 5 Drawing Sheets

U.S. PATENT DOCUMENTS

| | | | |
|---|---|---|---|
| 5,596,765 A * | 1/1997 | Baum et al. | 712/38 |
| 5,740,183 A * | 4/1998 | Lowe | 714/736 |
| 5,926,640 A * | 7/1999 | Mason et al. | 713/320 |
| 5,974,571 A * | 10/1999 | Riesenman et al. | 714/47.1 |
| 6,045,585 A * | 4/2000 | Blainey | 717/156 |
| 6,275,940 B1 * | 8/2001 | Edwards et al. | 726/2 |
| 6,505,313 B1 * | 1/2003 | Phan et al. | 714/718 |
| 7,653,844 B2 * | 1/2010 | Sasaki | 714/716 |
| 7,908,590 B1 * | 3/2011 | Min et al. | 717/124 |
| 2005/0114837 A1 * | 5/2005 | Blumenthal et al. | 717/124 |
| 2005/0223362 A1 * | 10/2005 | Whitlock et al. | 717/126 |
| 2007/0033440 A1 * | 2/2007 | Tillmann et al. | 714/38 |
| 2007/0033442 A1 * | 2/2007 | Tillmann et al. | 714/45 |
| 2007/0033576 A1 * | 2/2007 | Tillmann et al. | 717/124 |
| 2007/0061641 A1 * | 3/2007 | Yoon et al. | 714/724 |
| 2007/0240109 A1 * | 10/2007 | Chandra et al. | 717/114 |
| 2008/0098119 A1 * | 4/2008 | Jindal et al. | 709/228 |
| 2008/0127093 A1 * | 5/2008 | Fernandez-Ivern et al. | 717/124 |
| 2008/0155506 A1 * | 6/2008 | Boskovic | 717/124 |
| 2008/0256517 A1 * | 10/2008 | Atkin et al. | 717/124 |
| 2009/0064111 A1 * | 3/2009 | Kornerup et al. | 717/126 |
| 2009/0296588 A1 * | 12/2009 | Nishi et al. | 370/242 |

OTHER PUBLICATIONS

Title: JAOUT: automated generation of aspect-oriented unit test, autho: Guoqing Xu et al, dated: Nov. 30, 2004, source: IEEE.*

* cited by examiner

```
[TestAttribute()]
public void TestGet_Balance_0()
{
    int var0 = 0;
    int var1 = 0;
    bank.BankAccount inputThis = new bank.BankAccount(var0, var1);
    int var2 = inputThis.Balance;

#region Record State
    System.Reflection.MethodBase mb = System.Reflection.MethodInfo.GetCurrentMethod();
    Dottest.Framework.RecordState.ValueRecorder vr = new Dottest.Framework.RecordState.ValueRecorder(mb);
    vr.ObjectValue(inputThis, "bank.BankAccount", "inputThis");
    vr.Int32Value(var2, "var2");
    vr.FinishRecording();
    #endregion region Assertions
    Assert.AreEqual(0, inputThis.Balance);
    Assert.AreEqual(0, inputThis.CustomerId);
    Assert.AreEqual(0, var2);
    #endregion
}
```

FIG. 3

SYSTEM AND METHOD FOR RECORDING THE STATE OF VARIABLES AND OBJECTS WHEN RUNNING UNIT TESTS

CROSS-REFERENCE TO RELATED APPLICATION(S)

This Patent Application claims the benefit of the filing date of U.S. Provisional Patent Application Ser. No. 60/912,586, filed on Apr. 18, 2007 and entitled "System And Method For Recording The State Of Variables And Objects When Running Unit Tests," the entire content of which is hereby expressly incorporated by reference.

FIELD OF THE INVENTION

The present invention relates generally to testing computer software; and more particularly to a system and method for recording the state of variables and objects when running unit tests.

BACKGROUND

One of the important tasks while creating unit tests (whether manually or automatically) is to write assertions about the important variables and objects that are part of the test. When a user writes the unit tests manually, it is very tedious to write assertions for the many fields of complex objects. Further; even if the user writes the assertions once, if later, there is a change in behavior, the user has to revisit the assertions and change them, which can also be time consuming.

Therefore, there is a need for a new system and method to provide flexibility for the users to automatically generate assertions.

SUMMARY

In some embodiments, the present invention is a system and method for recording a state of an object in a computer program being tested. The system and method include: identifying an object having a plurality of fields, each field having a value; executing the computer program including a unit test; recording the values of each field of the identified object; generating assertions for the unit test from the recorded values of each field of the identified object; and inserting the generated assertions into the unit test. The computer program including the unit test having the generated assertions may be re-executed to verify the assertions. Furthermore, the unit test having the generated assertions may be modified and the computer program including the modified unit test having the generated assertions re-executed to generate new assertions. The generated new assertions are then inserted into the modified unit test, and the computer program including the modified unit test having the generated new assertions is re-executed to verify the new assertions.

BRIEF DESCRIPTION OF THE DRAWINGS

FIG. 3 is an exemplary unit test including the generated assertions, according to some embodiment of the present invention;

DETAILED DESCRIPTION

In some embodiments, the present invention is a system and method for recording the state of variables and objects when running unit tests, automatically generating assertions and inserting the generated assertion back into the unit tests. The present invention provides the user with the ability to specify the objects or variables for which the assertions to be automatically generated, instead of manually writing out the assertions. For example, the user may introduce a call that states "record all the various fields of a given object". The method and system of the present invention then process the given object and generate assertions that capture the current state of the object as evidenced by the values of the various fields of the object. One skilled in the art would readily recognize that the process of the present invention may be executed by any computer system, including a stand-alone computer, a system with a client/server architecture, an Internet-based system, or the like. The computer system would include a processor and memory for carrying out instructions to implement the process, a display monitor to display information to the user and an input device to take inputs from the user.

Figure 5:
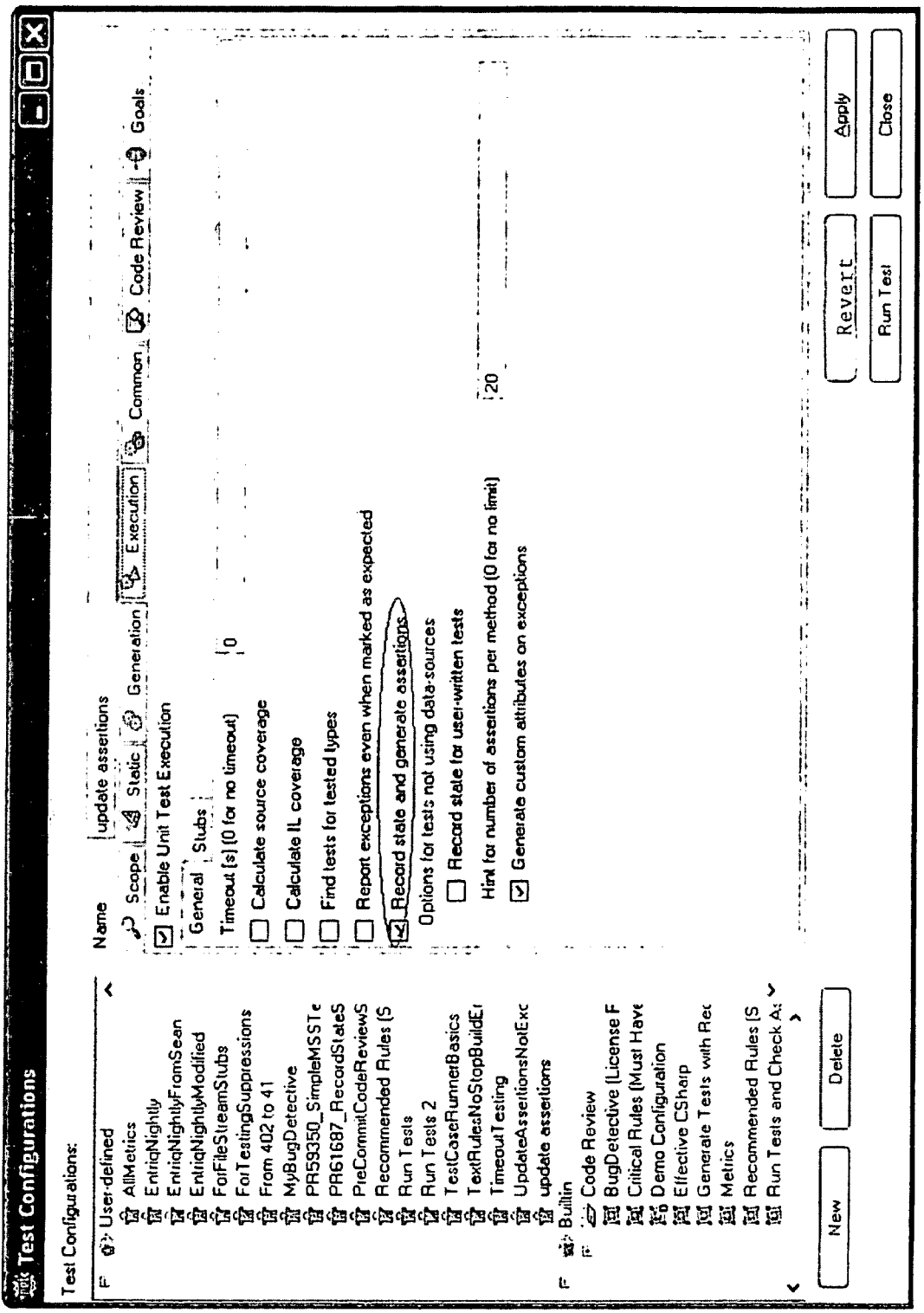
FIG. 5 shows an exemplary user interface for turning on/off the recording state option while running unit tests, according to some embodiments of the present invention.

In some embodiments, when the unit tests are being generated automatically, the invention provides the user with some control, for example, with a graphical user interface (GUI), in reviewing the generated unit tests and modifying them before generating the assertions. The user is also able to specify what object(s) he/she would like to generate the assertions for. FIG. 5 shows an exemplary user interface for selecting the option to generate assertions while running unit tests.

This provides the user with the flexibility to regenerate the assertions at a later time if the code changes. Furthermore, under some circumstances, it is useful to run the unit tests under different conditions. In such a case, the invention provides the user with the ability to generate assertions separately for each of these conditions. For example, the user may want to use different set of stubs or may want to run the tests with or without some stubs. In some embodiments, the user can do this by running the unit tests under different conditions with the option to generate the assertions turned on. The invention is then used to generate assertions under each of these conditions. Each set of assertions can be enclosed within conditionals (macros) so that while checking assertions the correct set of assertions gets used.

Figure 1:
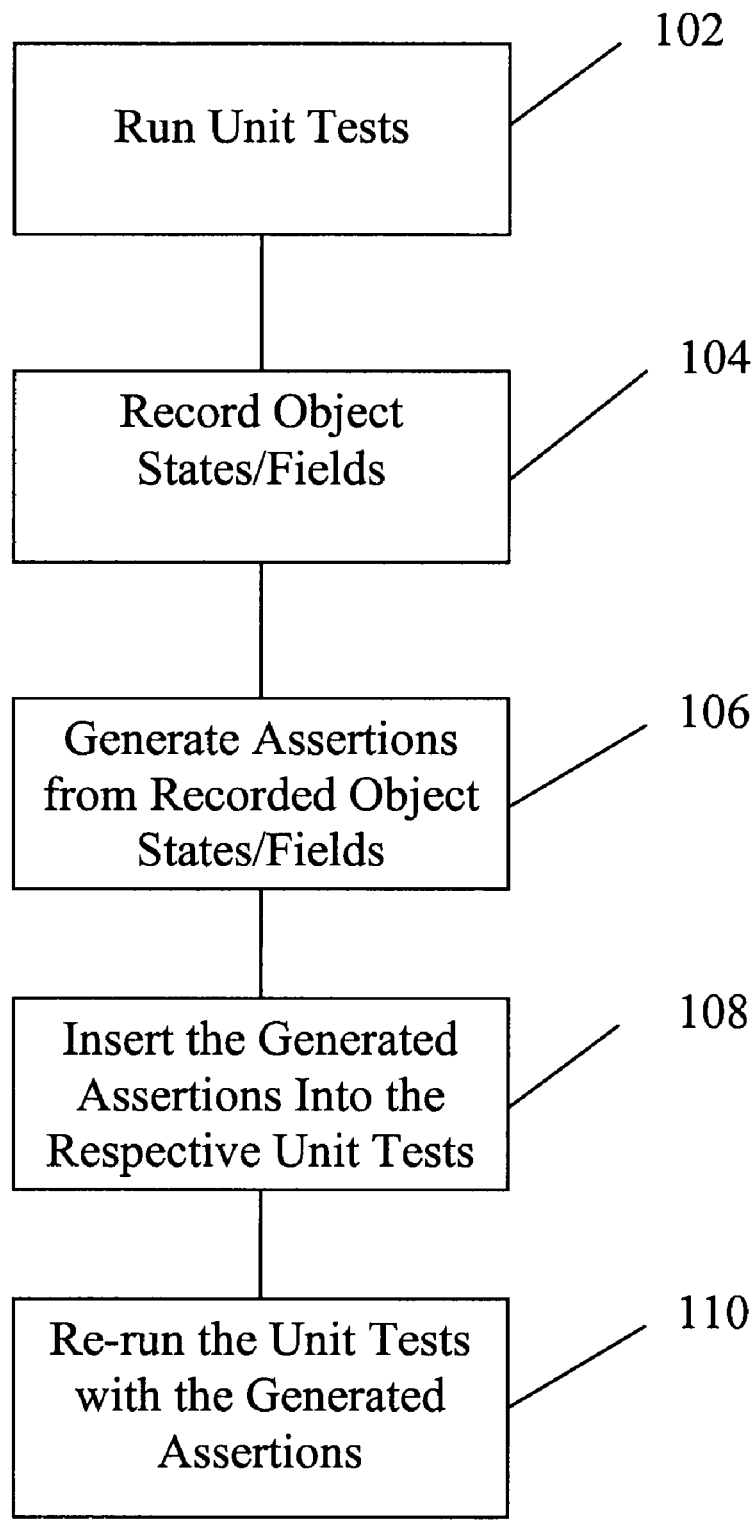
FIG. 1 is an exemplary process flow for automatically generating assertions, according to some embodiments of the present invention.
Figure 2:
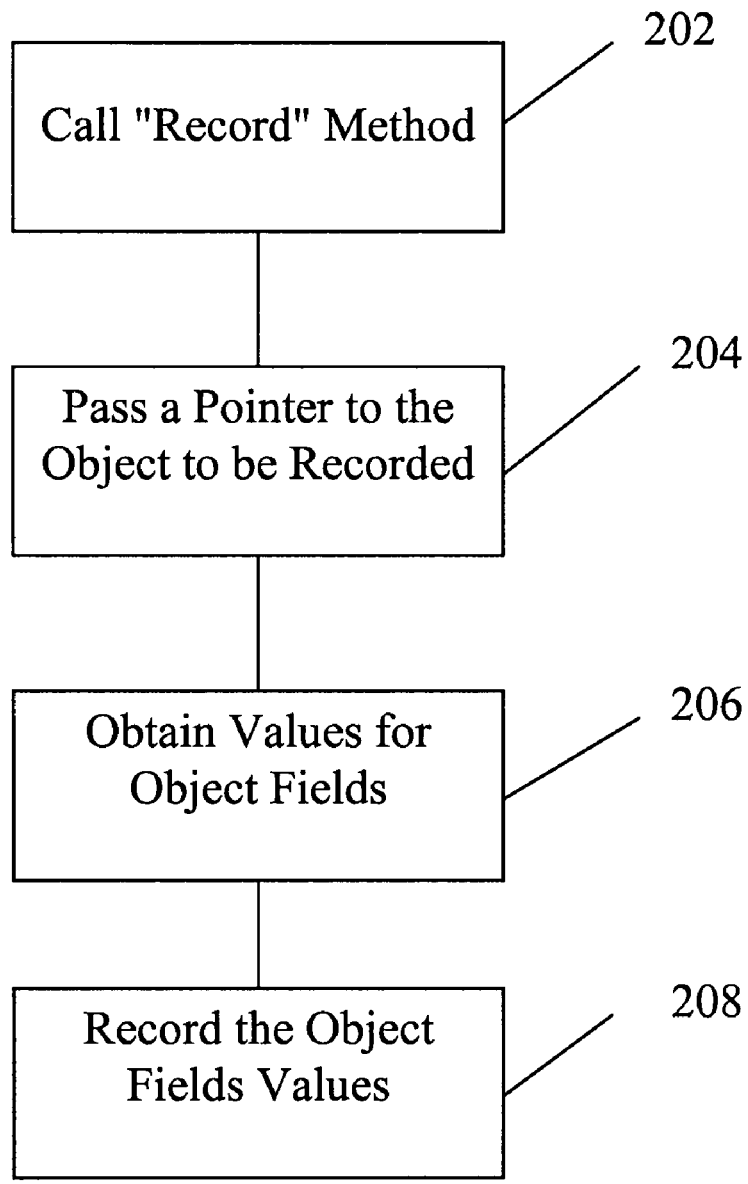
FIG. 2 is an exemplary process flow for recording object s states and fields, according to some embodiments of the present invention.

FIG. 1 depicts an exemplary process flow for automatically generating assertions, according to some embodiments of the present invention. The invention provides an option (for example, a boolean flag) to turn on or off the "assertion generation" feature. In block 102, the unit tests are executed with the "assertion generation" feature turned on. In some embodiments, the invention provides the user with a GUI, so that the user can specify what object(s) the assertions need to be generated for. In block 104, the object(s) state(s) including their various fields are recorded, while the unit tests are being executed. A more detailed description of this process is depicted in FIG. 2 and explained below. The invention then generates assertions for the objects that the user has specified, in block 106. The invention then inserts the generated assertions into the respective unit tests, as shown in block 108. The unit tests including the generated assertions are now ready to be used for test execution(s). They can be run regularly (for example, nightly) to verify that the software being tested has the same behavior as it had when the assertions were generated. A violation in the assertions implies that the behavior of the software has been changed and therefore the software being tested, or the test itself will need to be modified.

In some embodiments, the above process may be repeated on a frequent basis, for example, on a nightly (batch) basis. This way, any changes in the code, will generate new assertions (if applicable) and the new assertions would replace the old assertions in the respective unit tests.

FIG. 2 shows an exemplary process flow for recording objects' states and fields, according to some embodiments of the present invention. As shown, a "record" method is called, in block 202. In some embodiments, this record method is an application programming interface (API). An API is typically a source code interface that a computer system or program library provides in order to support requests for services to be made of the API by the computer program. An API is typically specified in terms of a programming language that can be compiled when an application is built. The software that provides the functionality described by an API is said to be an implementation of the API. The API itself is abstract, in that, it specifies an interface and does not get involved with implementation details.

In block 204, the record method passes a pointer to the object for which the various fields to be recorded. In block 206, the values of the fields of the object are then obtained and in block 206, the obtained values are recorded.

The same record state API may also be used while automatically generating unit tests. This provides the user with additional control over the types of assertions being generated, since now the user can choose to break the unit test generation into two phases, where in the first phase only the recording calls are generated. The user can then run the tests with the option to generate the assertions turned on. This second run generates the assertions in the user's code (software under test) and the test is ready to be used regularly to verify that the behavior of the software remains unchanged.

FIG. 3 is an exemplary unit test including the generated assertions, according to some embodiment of the present invention. The example in FIG. 3 shows both record state API calls and the assertions that are generated by using these calls. In this example, the record state API call states that the value of the object "inputThis" has to be recorded. The assertions for the fields of "inputThis" are generated automatically, when the user executes the unit tests with an option provided by the invention that enables the recording of the current state of the objects.

In some embodiments when the unit tests are generated, the method and system of the present invention automatically generate the unit tests with a configuration that generates the unit tests with calls to the record state API. The tests generated may be in Nunit, Junit, or any other format that the user has chosen to use. The user then runs test case execution with an option that makes execution record the values of object fields based on the record state API that are previously obtained. The user can change the unit tests including the record state API calls if necessary, before performing this task. The unit tests including the assertions are then inserted back in the source code. The user may then run test case execution that simply checks the assertions. The user is free to remove assertions from the unit tests if necessary and re-run the test either to re-generate new assertions or run the test without the removed assertions. In one embodiment, a menu option (or a GUI) is provided to the user to remove the assertions.

In some embodiments when the unit tests are manually written by the user, the user uses the record state API in the manually written unit tests to record the object fields and generate the assertions. The assertions then can be inserted into the respective unit tests manually or automatically.

In one embodiment, the record state API are C# calls, or .Net calls. In the example of FIG. 3, a test which has record state API calls in it is shown. In one embodiment, the calls are implemented as vr.ObjectValue( ), vr.Int32Value( ), etc. In this implementation, for fields that represent an (complex) object, the values of the "properties" (e.g., fields) of the given object are obtained via reflection. In some embodiment, a monitoring program may be used to obtain the values for the various fields of the objects. A monitoring program is described in a co-pending and co-owned U.S. patent application Ser. No. 11/396,168, entitled "System And Method For Test Generation," the entire contents of which is herein incorporated fully by reference.

For example, in this embodiment, the invention monitors the execution of the computer program under test to obtain monitored information, it then records the monitored information and analyzes the recorded monitored information to obtain the values for the various fields of the objects. The monitored information includes data uniquely identifying a thread in which a method is invoked, instance object on which the method was invoked, method arguments, place of the method invocation amongst other method invocations, and return value of the methods. The information may also include data about the objects and processes the method would interact with and environmental variables information, objects calling sequence. The objects calling sequence may be implied from temporal recording of sequence of calls from the execution of computer program. Monitoring the execution of the computer program may comprise profiling interfaces available for a given program type, or instrumenting the source code or the binary code of the computer program. Recording the identified objects may comprise utilizing serialization and deserialization methods provided by an API of the computer program or a user-defined API.

In some embodiments, the values of the various fields of the objects are obtained via a reflection process. The well known reflection process is the process by which a computer program can observe and modify its own structure and behavior. Reflection can be used for self-optimization or self-modification of a program. A reflective sub-component of a program will monitor the execution of a program and will optimize or modify itself according to the function the program is solving.

For primitive types, the values of the "properties" (e.g., fields) of the given object are obtained directly from the variable in the call as seen for var2, in FIG. 3.

In one embodiment, the invention uses a Boolean flag to determine whether to record the values or simply return without doing any work. This allows the invention to use the same record state API for executing the unit test without enabling the assertion generation feature.

Figure 4:
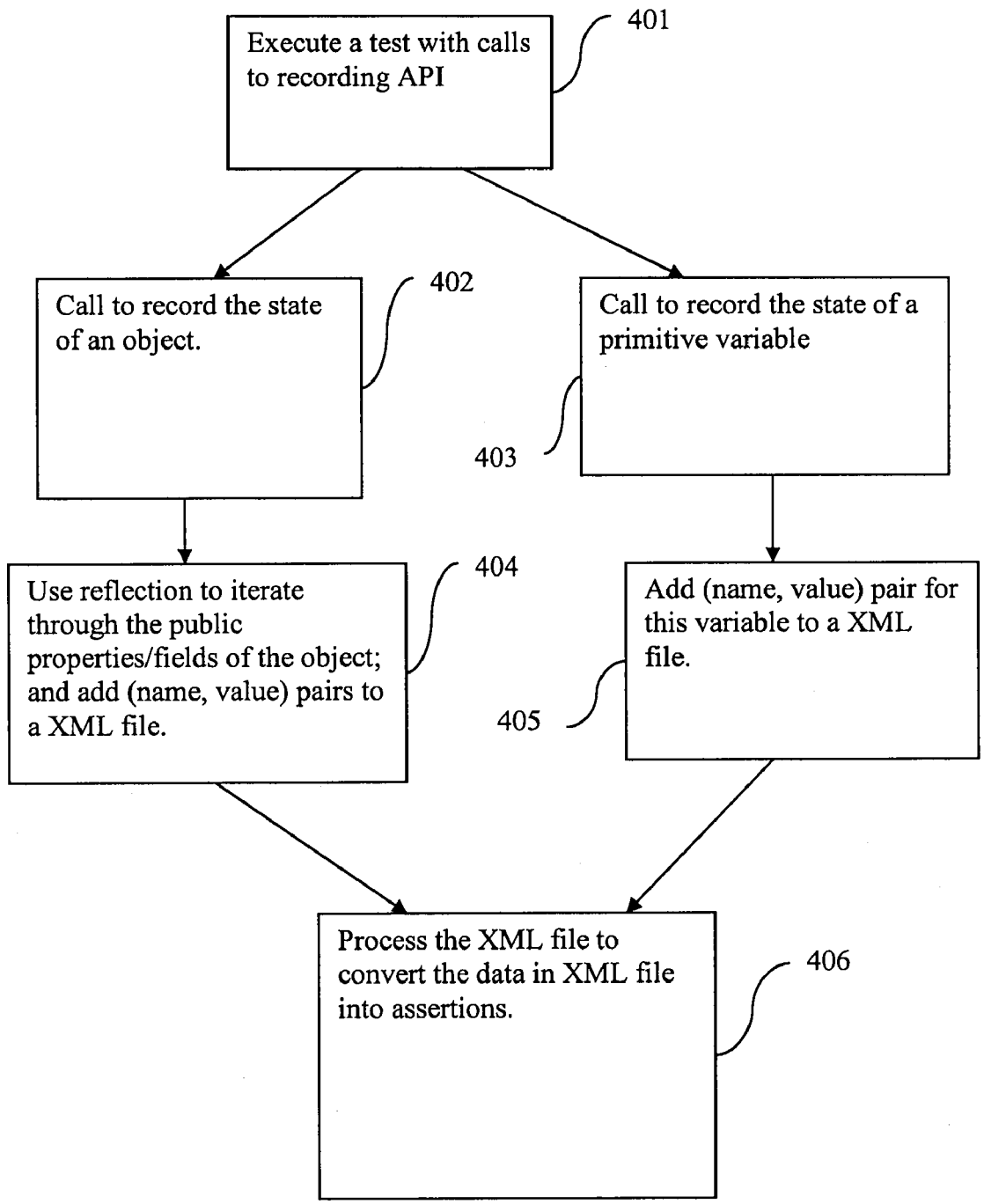
FIG. 4 is an exemplary process flow for automatically generating assertions, according to some embodiments of the present invention.

FIG. 4 is an exemplary process flow for automatically generating assertions, according to some embodiments of the present invention. In this example, an Extensible Markup Language (XML) file that has information about the variable/object and its values is created. The (variable, value) pair is added to the XML file for all the variables mentioned in the record state API. The XML file is then processed by another component that converts them into assertions and writes them into the appropriate locations in the source code. In block 401, the user executes a unit test with call to a record state API.

When a call to record the state of an object is encountered (block 402), in some embodiments, the invention uses reflection technology (as explained above), to iterate through the various fields of the object. The invention then adds/stores (name, value) pairs to an XML file that is used for recording the state of the objects, as shown in block 404. In block 406, the invention then processes the XML file for this test by a source generator code to convert the data in the XML file into assertions. In one embodiment, this is accomplished by converting the data from XML format to C# code. It is noted that the invention is not restricted to write the data into an XML file, rather, any format can be used. Further, it is also be possible to pass the data to a source generator component without writing it to a file, that is, the data can be passed in memory.

A call may be made to record the state of some primitive type variables (block 403). This call includes the value and the name of the variable. In this case, the invention adds/stores (name, value) pair for the primitive variable to the XML file that is used for recording the values of the variables for this test, in block 405 and proceeds to block 406 to convert the data, as explained above.

FIG. 5 shows an exemplary GUI for turning on/off the recording state option while running unit tests, according to some embodiments of the present invention. As shown, selecting the option of "Record state and generate assertion" turns on the recording state option. As shown, the GUI has several tabs (buttons) such as Scope, Static, Execution, etc. The Execution tab controls the options that the user can specify while running the tests. This tab includes (shows) many options, for example, "Record state and generate assertions". When this option is turned on, the tool uses the record state API statements to find the values of the fields in the objects and records them as indicated in boxes 404 and 405 of FIG. 4.

The "Calculated Source Coverage" provides information about which lines in the source code were executed while running the tests. The "Calculated IL Coverage" tab is similar to the above option, however, it refers to the instructions in the Intermediate Language (IL) instead of the lines in the source code. The "Report Exceptions even when marked as expected" option provides the users with the capability of executing tests with an option to causes an exception to be affected by the test. The exception may be the expected behavior of the software (or a portion thereof) under test. Therefore, when the test cases are executed, these exceptions are typically not reported to the user. However, sometimes the user may like to see these exceptions as well. The user can do so by selecting the "Report Exceptions even when marked as expected" option.

The other two options—"Record state for user written tests" and "Generate custom attribute on exceptions" provide the user with more control over the recording process. The first option allows the recording and updating of assertions to work on manually written tests, where as the second option provides the user with an option to turn on/off generating information on exceptions that are encountered during testing.

In some embodiments, the following APIs, or a combination thereof are supported for recording the state of the fields, variables and/or objects:

ValueRecorder is the class that supports the API for recording the states of the objects. It has the following methods that can be used in unit tests in a manner similar to how they are used in the above example. The following list is exemplary and not exhaustive—other methods not listed may also be used in the unit tests.

1. ObjectValue(object variableRef, string variableType, string variableName): variableRef is a reference to the object whose value is getting recorded, variableType is the type of the object whose value is being recorded, variableName is the name of the variable whose value is being recorded.
2. Int8Value(System.Int8 variable, string variableName): variable is the actual variable whose value is recorded and so the value is directly used while generating the (name, value) pair. VariableName is the name of the variable.
3. API for integers of other sizes (16, 32, 64) are provided in the same way as we do above for 8 bit integers. Same holds true for unsigned integers.
4. Booleanvalue(bool variable, string variableName): Works similar to Int8Value.
5. ByteValue(byte variable, string variableName): Works similar to Int8Value. Sbyte also works in the same way.
6. DecimalValue(System.Decimal variable, string variableName): Works similar to Int8Value
7. DoubleValue(System.Double variable, string variableName): Works similar to Int8Value
8. SingleValue(System.Single variable, string variableName): Works similar to Int8Value
9. CharValue(char variable, string variableName): Works similar to Int8Value
10. StringValue(string variable, string variableName): Works similar to Int8Value When the same unit test is run many times using different data (for example, by using data from each row of an excel spreadsheet or a data base table), it is not possible to embed the values of the fields of the objects within the assertions in the source code. As a result, in this situation, the implementation of the API used for recording stores the values in an external file. For each row in the input data source, there is a corresponding row of values in the external file. When the test is executed to check the assertions, the values from this file are read and the values are verified. Thus for example, let us assume that the input data source has 3 rows with the values:
Row 1: ("hello", 3)
Row 2: ("world", 8)
Row 3: ("How are you", 96).

Further, let us assume that at the end of running the unit test, the value of a variable "var1" was 103 for Row 1, 208 for Row 2, and 596 for Row 3. Then, in one embodiment, these values are stored in the external file. When the test is run for checking assertions, the invention fetches the values from the external file and verifies that the value of var1 is 103 for Row 1, 208 for Row 2, and so on.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for recording a state of an object in a computer program, the method comprising:
    generating a unit test identifying an object to be monitored, the object having a plurality of fields, each field having a value;

executing the computer program including the generated unit test;

recording the values of one or more fields of the identified object;

generating assertions for the unit test from the recorded values of the one or more fields of the identified object;

inserting the generated assertions into the unit test; and re-executing the computer program including the unit test having the generated assertions to verify the computer program based on the assertions.

2. The method of claim 1, further comprising:

modifying the unit test having the generated assertions;

re-executing the computer program including the modified unit test having the generated assertions to generate new assertions;

inserting the generated new assertions into the modified unit test; and re-executing the computer program including the modified unit test having the generated new assertions to verify the new assertions.

3. The method of claim 1, wherein the recording the values of each field comprises:

calling a record method;

passing a pointer to the identified object;

obtaining the values for the object fields; and recording the values for the object fields.

4. The method of claim 3, wherein the record method is an application programming interface (API).

5. The method of claim 4, wherein the API is at least one of a C# or .Net call.

6. The method of claim 1, wherein the values for the object fields are stored in an Extensible Markup Language (XML) file.

7. The method of claim 1, wherein the unit test is one of a Nunit or a Junit.

8. The method of claim 1, wherein the object is a complex object.

9. The method of claim 8, further comprising: iterating through the fields of the complex object using reflection; and storing (name, value) pairs for each field of the object in an Extensible Markup Language (XML) file.

10. The method of claim 8, further comprising: iterating through the fields of the complex object using a monitoring program; and storing (name, value) pairs for each field of the object in an Extensible Markup Language (XML) file.

11. The method of claim 10, wherein the monitoring program comprise profiling interfaces available for a given program type, and recording the identified object fields utilizing serialization and deserialization methods provided by an application programming interface (API).

12. The method of claim 1, wherein the object includes a primitive variable, and wherein the recording of the value of the primitive variable comprises storing (name, value) pair for the primitive variable in an Extensible Markup Language (XML) file.

13. A method for recording a state of an object in a computer program, the method comprising:

identifying an object having a plurality of fields, each field having a value;

executing the computer program including a unit test;

recording the values of one or more fields of the identified object;

generating assertions for the unit test from the recorded values of said one or more fields of the identified object;

storing the recorded values in the test unit to modify the unit test; and re-executing the computer program with the modified unit test to verify the computer program based on the generated assertions.

14. The method of claim 13, wherein the recording the values of each field comprises:

calling a record method;

passing a pointer to the identified object;

obtaining the values for the object fields; and recording the values for the object fields.

\* \* \* \* \*